United States Patent [19]

Vilmur et al.

[11] Patent Number: 4,811,404

[45] Date of Patent: Mar. 7, 1989

[54] NOISE SUPPRESSION SYSTEM

[75] Inventors: Richard J. Vilmur, Palatine; Joseph J. Barlo; Ira A. Gerson, both of Hoffman Estates; Brett L. Lindsley, Palatine, all of Ill.

[73] Assignee: Motorola, Inc., Schaumburg, Ill.

[21] Appl. No.: 103,857

[22] Filed: Oct. 1, 1987

[51] Int. Cl.[4] .............................................. H04B 15/00

[52] U.S. Cl. ........................................ 381/94; 381/47; 381/71; 455/305; 455/306; 328/167

[58] Field of Search ...................... 381/94, 47, 71, 102, 381/107, 68, 68.2, 58, 57, 158; 455/303, 305, 306, 312; 328/167

[56] References Cited

U.S. PATENT DOCUMENTS

| | | | |
|---|---|---|---|
| 3,403,224 | 9/1968 | Schroeder | 179/1 |
| 3,784,749 | 1/1974 | Shigeyama et al. | 179/1 P |
| 3,803,357 | 4/1974 | Sacks | 179/1 |
| 3,988,679 | 10/1976 | Clarke et al. | 325/377 |
| 4,025,721 | 5/1977 | Graupe et al. | 179/1 P |
| 4,110,784 | 8/1978 | Amery et al. | 328/167 |
| 4,185,168 | 1/1980 | Graupe et al. | 179/1 P |
| 4,270,223 | 5/1981 | Marston | 455/305 |
| 4,287,475 | 9/1981 | Eaton et al. | 328/167 |
| 4,325,068 | 4/1982 | Mercer | 455/305 |
| 4,628,529 | 12/1986 | Borth et al. | 381/94 |
| 4,630,304 | 12/1986 | Borth et al. | 381/94 |
| 4,630,305 | 12/1986 | Borth et al. | 381/94 |
| 4,635,217 | 1/1987 | O'Connor et al. | 455/303 |
| 4,648,127 | 3/1987 | Jongepier | 455/303 |

OTHER PUBLICATIONS

Hellwarth, George A. et al., "Automatic Conditioning of Speech Signals", *IEEE Transactions on Audio and Electroacoustics,* vol. AU-16, No. 2, (Jun. 1968), pp. 169-179.

Hess, Wolfgang J., "A Pitch-Synchronous Digital Feature Extraction System for Phonemic Recognition of Speech", *IEEE Transactions on Acoustics, Speech and Signal Processing,* vol. ASSP-24, No. 1, (Feb. 1976), pp. 14-25.

Lim, Jae S. et al., "Enhancement and Bandwidth Compression of Noisy Speech", *Proceedings of the IEEE,* vol. 67, No. 12, (Dec. 1979), pp. 1586-1604.

McAulay, Robert J. et al., "Speech Enhancement Using a Soft-Decision Noise Suppression Filter" *IEEE Transactions on Acoustics, Speech, and Signal Processing,* vol. ASSP-28, No. 2, Apr. 1980, pp. 137-145.

Morris, C. F., "A New VOX Technique for Reducing Noise in Voice Communication Systems", *Proceedings of IEEE Southeastcon 74,* Region 3 Conference, (Apr. 29-May 1, 1974), pp. 257-259.

Morris, C. F., "Digital Processing for Noise Reduction in Speech", *Proceedings of the 1976 IEEE Southeastcon Region 3 Conference on Engineering in a Changing Economy,* (Apr. 5, 6, 7, 1975), pp. 98-100.

Orban, Robert, "A Program-Controlled Noise Filter", *Journal of the Audio Engineering Society,* (Jan./Feb. 1974), vol. 22, No. 1, pp. 2-9.

*Primary Examiner*—Jin F. Ng
*Assistant Examiner*—David H. Kim
*Attorney, Agent, or Firm*—Douglas A. Boehm; Charles L. Warren; Anthony J. Sarli, Jr.

[57] ABSTRACT

An improved noise suppression system (800) is disclosed which performs speech quality enhancement upon the speech-plus-noise signal available at the input (205) to generate a clean speech signal at the output (265) by spectral gain modification. The improvements of the present invention include the addition of a signal-to-noise ratio (SNR) threshold mechanism (830) to reduce background noise flutter by offsetting the gain rise of the gain tables until a certain SNR threshold is reached, the use of a voice metric calculator (810) to produce more accurate background noise estimates via performing the update decision based on the overall voice-like characteristics in the channels and the time interval since the last update, and the use of a channel SNR modifier (820) to provide immunity to narrowband noise bursts through modification of the SNR estimates based on the voice metric calculation and the channel energies.

50 Claims, 8 Drawing Sheets

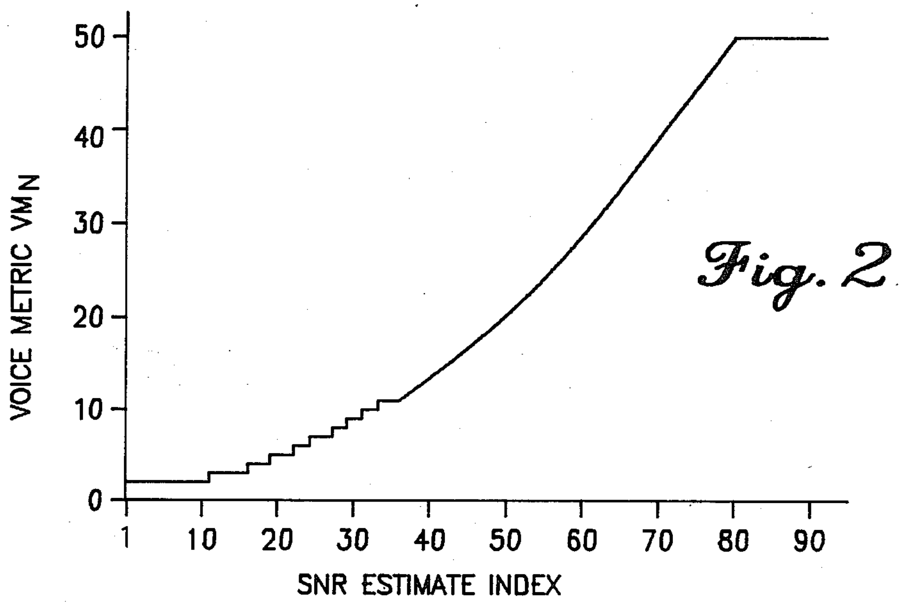
Fig. 2
Fig. 3
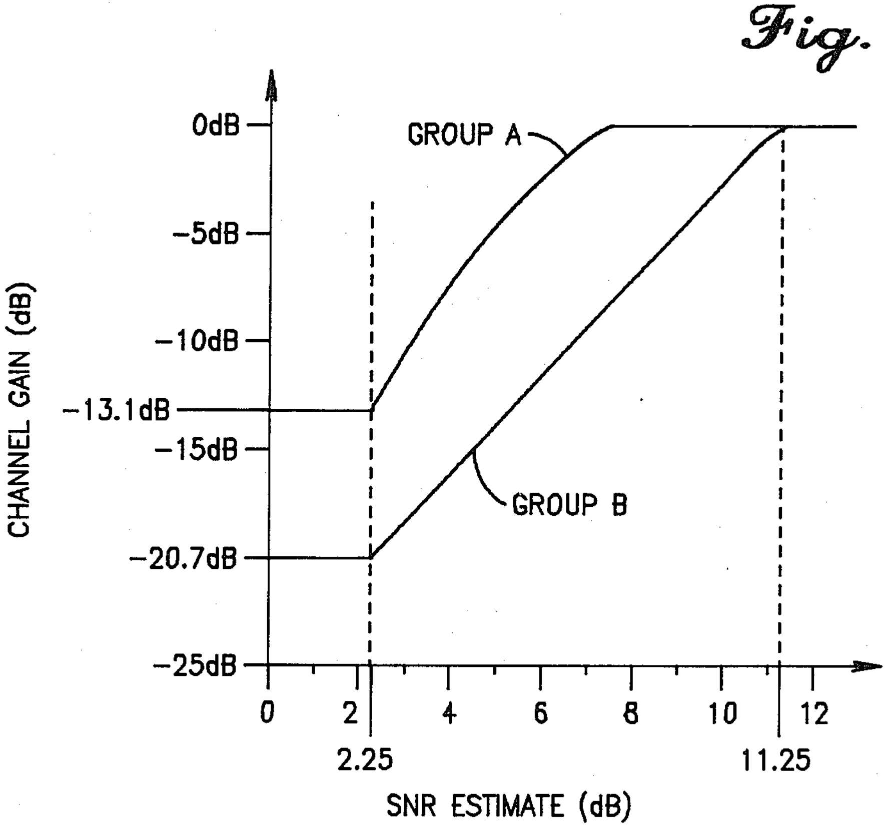

NOISE SUPPRESSION SYSTEM

CROSS-REFERENCES TO RELATED APPLICATIONS

This application incorporates by reference U.S. Pat. No. 4,628,529, assigned to the same assignee as the present application. Furthermore, this application contains subject matter related to U.S. Pat. No. 4,630,304 and U.S. Pat. No. 4,630,305, also assigned to the same assignee as the present application.

Background of the Invention

1. Field of the Invention

The present invention relates generally to acoustic noise suppression systems. The present invention is more specifically directed to improving the speech quality of a noise suppression system employing the spectral subtraction noise suppression technique.

2. Description of the Prior Art

Acoustic noise suppression in a speech communication system generally serves the purpose of improving the overall quality of the desired audio signal by filtering environmental background noise from the desired speech signal This speech enhancement process is particularly necessary in environments having abnormally high levels of ambient background noise, such as an aircraft, a moving vehicle, or a noisy factory.

The noise suppression technique described in the aforementioned patents is the spectral subtraction—or spectral gain modification—technique Using this approach, the audio input signal is divided into individual spectral bands by a bank of bandpass filters, and particular spectral bands are attenuated according to their noise energy content. A spectral subtraction noise suppression prefilter utilizes an estimate of the background noise power spectral density to generate a signal-to-noise ratio (SNR) of the speech in each channel, which, in turn, is used to compute a gain factor for each individual channel The gain factor is used as a pointer for a look-up table to determine the attenuation for that particular spectral band. The channels are then attenuated and recombined to produce the noise-suppressed output waveform.

In specialized applications involving relatively high background noise environments, most noise suppression techniques exhibit significant performance limitations. One example of such an application is the vehicle speakerphone option to a cellular mobile radio telephone system, which provides hands-free operation for the automobile driver. The mobile hands-free microphone is typically located at a greater distance from the user, such as being mounted overhead on the visor. The more distant microphone delivers a much poorer signal-to-noise ratio to the land-end party due to road and wind noise conditions. Although the received speech at the land-end is usually intelligible, continuous exposure to such background noise levels often increases listener fatigue.

Although most prior art techniques perform sufficiently well under nominal background noise conditions, the performance of known techniques becomes severely limited in such specialized applications of unusually high background noise Typical spectral subtraction noise suppression systems may reduce the background noise level over the voice frequency spectrum by as much as 10 dB without seriously affecting the speech quality. However, when the prior art techniques are used in relatively high background noise environments requiring noise suppression levels approaching 20 dB, there is a substantial degradation in the quaity characteristics of the voice. Furthermore, in rapidly-changing high noise environments, a severe low frequency noise flutter develops in the output speech signal which resembles a distant "jet engine roar" sound. This noise flutter is inherent in a spectral subtraction noise suppression system, since the individual channel gain parameters are continuously being updated in response to the changing background noise environment.

The background noise flutter problem was indirectly addressed but not eliminated through the use of gain smoothing. For example, R.J. McAulay and M.L. Malpass, in the article entitled "Speech Enhancement Using a Soft-Decision Noise Suppression Filter', *IEEE Trans. Acoust., Speech, Signal Processing,* Vol. ASSP-28, No. 2 (April 1980), pp. 137–145, propose the use of gain smoothing on a per-frame basis to avoid the introduction of discontinuities in the output waveform Since the introduction of gain smoothing can cause the noise suppression prefilter to be slow to respond to a leading edge transition (which would result in speech distortion), a weighting factor of 1 or ½ was chosen such that the prefilter responds immediately to an increase in gain while tending to smooth any decrease in gain. Unfortunately, excessive gain smoothing still produces noticeable detrimental effects in voice quality, the primary effect being the apparent introduction of a tail-end echo or "noise pump" to spoken words. There is also a significant reduction in voice amplitude with large amounts of gain smoothing.

The noise flutter performance was further improved by the technique of smoothing the noise suppression gain factors for each individual channel on a per-sample basis instead of on a per-frame basis. Persample smoothing, as well as utilizing different smoothing coefficients for each channel, is described in U.S. Pat. No. 4,630,305, entitled "Automatic Gain Selector for a Noise Suppression System." However, none of the known prior art techniques appreciate that the primary source of the channel gain discontinuities is the inherent fluctuation of background noise in each channel from one frame to the next. In known spectral subtraction systems, even a 2 dB SNR variation would create a few dB of gain variation, which is then heard as an annoying background noise flutter. Hence, the flutter problem has never been effectively solved.

Moreover, narrowband noise—that which has a high power spectral density in only a few channels—further complicates the background noise flutter problem. Since these few high energy noise channels would not be attenuated by the background noise suppressor, the resultant audio output has a "running water" type of characteristic. Narrowband noise bursts also degrade the accuracy of the background noise update decision required to perform noise suppression in changing background noise environments.

Since the gain factors are chosen by SNR estimates, which are determined by the speech energy in each channel (signal) and the current background noise energy estimate in each channel (noise), the performance of the entire noise suppression system is based upon the accuracy of the background noise estimate The statistics of the background noise are estimated during the time when only background noise is present, such as during the pauses in human speech. Therefore, an accurate speech/noise classification must be made to determine when such pauses in speech are occurring.

It is widely known that the energy histogram technique for distinguishing between background noise and speech perform sufficiently well in normal ambient noise environments. See, e.g., W.J. Hess, "A Pitch Synchronous Digital Feature Extraction System for Phonemic Recognition of Speech," *IEEE Trans. Acoust., Speech, Signal Processinq,* Vol. ASSP-24, No. 1 (February 1976), pp. 14–25. Energy histograms of acoustic signals exhibit a bimodal distribution in which the two modes correspond to noise and speech. Thus, an appropriate threshold can be set between the two modes to provide the speech/noise classification. However, the distinction between background noise energy and unvoiced speech energy in relatively high background noise environments is unclear. Consequently, the task of accurately finding the two modes of the energy histogram, and setting the appropriate threshold between them, is extremely difficult.

To accommodate changing noise backgrounds, McAulay and Malpass implement an adaptive threshold by constantly monitoring the histogram energy on a frame-byframe basis, and updating the threshold utilizing different decay factors. Alternatively, U.S. Pat. No. 4,630,304 utilizes an energy valley detector to perform the speech/noise decision based upon the post-processed signal energy—signal energy available at the output of the noise suppression system—to determine the detected speech minimum Thus, the accuracy of the background noise estimate is improved since it is based upon a much cleaner speech signal.

However, neither prior art technique is properly responsive to a sudden, strong increase in background noise level. These background noise estimate updating decision processes interpret a sudden, loud noise level rise as speech, such that no updates are performed. The energy histogram or valley detector has a slow adaptation characteristic which will eventually adapt to the higher noise level. However, this adaptation characteristic does lead to incorrect noise updates on the weaker energy portions of speech. This erroneous decision significantly degrades the performance of the noise suppression system.

A need, therefore exists for an improved acoustic noise suppression system which addresses the problems of background noise fluctuation, narrowband noise bursts, and sudden background noise increases.

SUMMARY OF THE INVENTION

Accordingly, it is an object of the present invention to provide an improved method and apparatus for suppressing background noise in high background noise environments without significantly degrading the voice quality.

Another object of the present invention is to provide an improved noise suppression system that addresses the background noise fluctuation problem without requiring large amounts of gain smoothing.

A further object of the present invention is to provide a spectral subtraction noise suppression system which compensates for the detrimental effects of narrowband noise bursts.

Another object of the present invention is to provide a background noise estimation mechanism which is not misled by low energy portions of speech, yet still provides correction for sudden, strong increases in background noise levels.

These and other objects are achieved by the present invention which, briefly described, is an improved noise suppression system for attenuating the background noise from a noisy input signal to produce a noise-suppressed output signal by spectral gain modification., The noise suppression system (800) includes a mechanism (210) for separating the input signal into a plurality of pre-processed signals representative of selected frequency channels, a mechanism (310) for generating an estimate of the signal-to-noise ratio (SNR) in each individual channel; a mechanism (590) for producing a gain value for each individual channel by automatically selecting one of a plurality of gain values from a particular gain table in response to the channel SNR estimates, and a mechanism (250) for modifying the gain of each of the plurality of pre-processed signals in response to the selected gain values to provide a plurality of post-processed noisesuppressed output signals. The improvements of the present invention relate to the addition of an SNR threshold mechanism (830) to eliminate minor gain fluctuations for low SNR conditions, a voice metric calculator (810) to produce a more accurate background noise estimate update decision, and a channel SNR modifier (820) to suppress narrowband noise bursts.

More specifically, the first aspect of the present invention pertains to the addition of an SNR threshold mechanism (830) for providing a predetermined SNR threshold which the channel SNR estimates must exceed before a gain value above a predefined minimum gain value can be produced. In the preferred embodiment, the SNR threshold is set at 2.25 dB SNR, such that minor background noise fluctuations do not create step discontinuities in the noise suppression gains.

According to the second aspect of the present invention, a voice metric calculator (810) is utilized to perform the speech/noise classification for the background noise update decision using a two-step process. First, the raw SNR estimates are used to index a vocce metric table to obtain voice metric values for each channel. A voice metric is a measurement of the overall voice-like characteristics of the channel energy. The individual channel voice metric values are summed to create a first multi-channel energy parameter, and then compared to a background noise update threshold. If the voice metric sum does not meet the threshold, the input frame is deemed to be noise, and a background noise update is performed. Secondly, the time since the occurrence of the previous background estimate update is constantly monitored. If too much time has passed since the last update, e.g., 1 second, then it is assumed that a substantial increase in noise has occurred, and a background noise update is performed regardless of whether it looks like a voice frame. This second test is based on the assumption that speech seldom contains continuous high energy levels in all channels for more than one second, which would be the case for a sudden, loud noise level increase. The voice metric algorithm incorporating the two-step decision process provides a very accurate background noise estimate update signal.

In the third aspect of the present invention, a channel SNR modifying mechanism (820) provides a second multi-channel energy parameter in response to the number of upper-channel SNR estimates which exceed a predetermined energy threshold, e.g., 6 dB SNR. If only a few channels have an energy level above this energy threshold (such as would be the case for a narrowband noise burst), the measured SNR for those particular channels would be reduced. Moreover, if the aforementioned voice metric sum is less than a metric threshold (which would indicate that the frame was noise), all channels are similarly reduced. This SNR modifying technique is based on the assumption that typical speech exhibits a majority of channels having signal-to-noise ratios of 6 dB or greater.

BRIEF DESCRIPTION OF THE DRAWINGS

The features of the present invention which are believed to be novel are set forth with particularity in the appended claims. The invention itself, however, together with further objects and advantages thereof, may best be understood by reference to the following description when in conjunction with the accompanying in which:

FIG. 2 is a graph representing voice metric values output as a function of SNR estimate index values input for the voice metric calculator block of FIG. 1;

FIG. 3 is a representative gain table graph illustrating the overall channel attenuation for particular groups as a function of the SNR estiaate.

DETAILED DESCRIPTION OF THE PREFERRED EMBODIMENT

Figure 1:
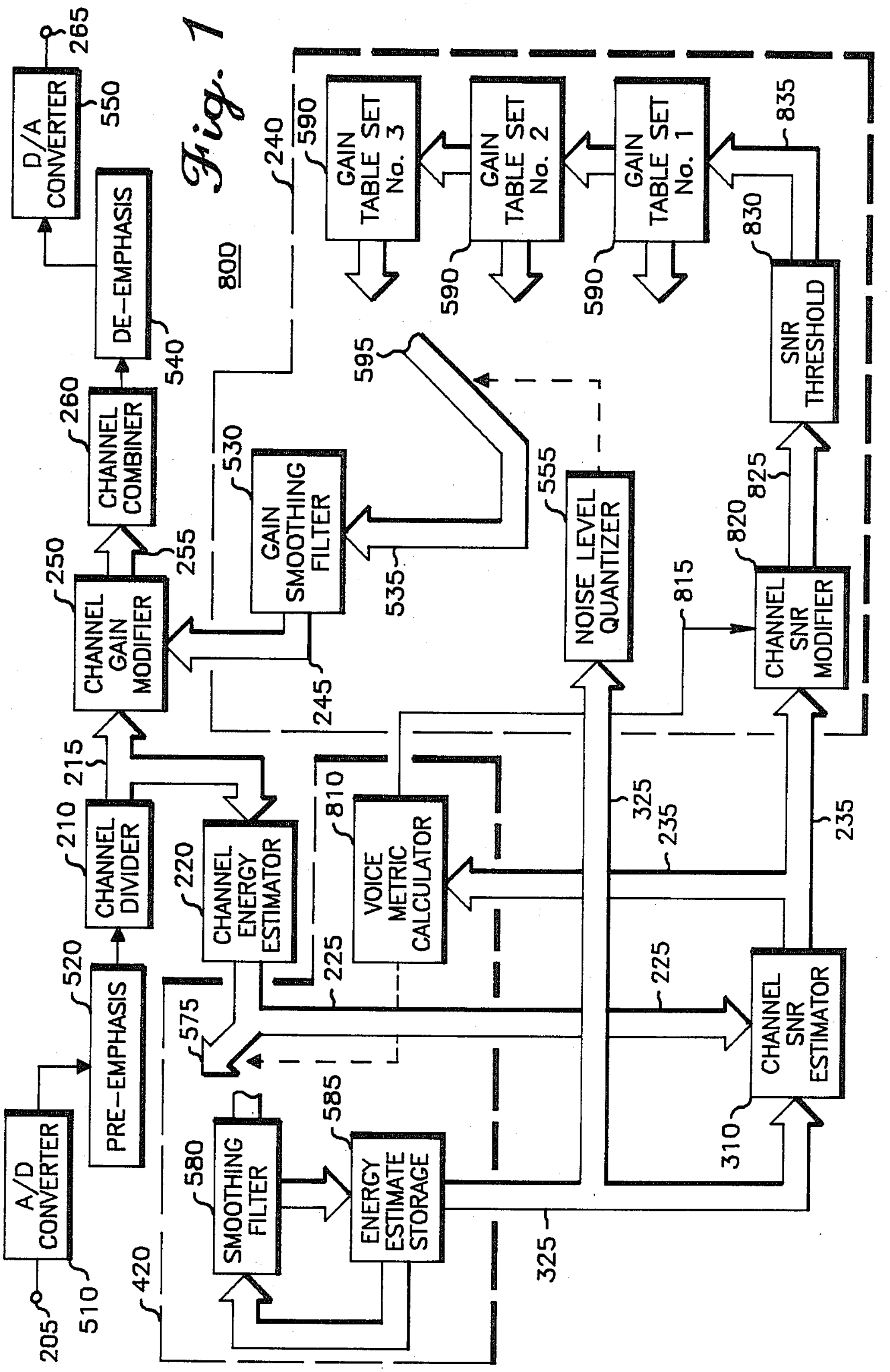
FIG. 1 is a detailed block diagram illustrating the preferred embodiment of the improved noise suppression system according to the present invention.

FIG. 1 is a detailed block diagram of the preferred embodiment of the present invention. All the elements of FIG. 1 having reference numerals less than 600 correspond to those of U.S. Pat. No. 4,628,529-Borth et al., which is incorporated herein by reference. Refer to the Borth patent for their description. The additional circuit components having reference numerals greater than 600 represent the improvements to the system, and will be described herein.

Improved noise suppression 800 incorporates changes to the aforementioned Borth noise suppression system in three basic areas: (a) the updating of background noise estimates by voice metric calculator 810; (b) the modification of SNR estimates by channel SNR modifier 820; and (c) utilization of SNR threshold block 830 to offset the gain rise of each channel. Each of these improvements will be described in terms of the block diagram of FIG. 1, and in terms of the flowchart of FIG. 4a–4f.

Voice metric calculator 810 replaces the valley detector circuitry of the previous system. A voice metric is essentially a measurement of the overall voice-like characteristics of channel energy. In the preferred embodiment, voice metric calculator 810 is implemented as a look-up table which translates the individual channel SNR estimates at 235 into voice metric values. The voice metric values are used internally to determine when to update the background noise estimate, by closing channel switch 575 for one frame. As used herein, updating the background noise estimate is defined as partially modifying the old background noise estimate with a new estimate using, for example, a 10%/90% new-to-old estimate ratio. The voice metric values are also used in the channel SNR modifying process as will subsequently be described.

From the perspective of making a background noise update decision, a frame having high energy, which is typically indicative of a speech frame, could also mean that a narrowband noise transient or a sudden increase in the background noise level has occurred. Therefore, the present invention characterizes the frame energy as a voice metric sum, VMSUM, and utilizes this multichannel energy parameter to perform the updating decision. The process utilize a voice metric table which may be represented as a curve as shown in FIG. 2.

FIG. 2 is a graph illustrating the characteristic curve of the voice metrics for a particular channel The horizontal axis represents SNR estimate indices. Each SNR estimate index value represents three-eighths ($\frac{3}{8}$) dB signal-to-noise ratio. Hence, an SNR estimate index of 10 represents 3.75 dB SNR. The vertical axis represents voice metric values VM(CC) for each of the N channels. Note that a voice metric of 2 is produced for an SNR index of 1. Also note that the curve is not linear, since a channel energy has more voice-like characteristics at higher SNR's First, the raw SNR estimates are used to index into the voice metric table to obtain a voice metric value VM(CC) for each channel. Second, the individual channel voice metric values are summed to create the total of all individual channel voice metric values, called the voice metric sum VMSUM. Third, VMSUM is compared to an UPDATE THRESHOLD representative of a voice metric total that is deemed to be noise. If the multichannel energy parameter VMSUM is less than the UPDATE THRESHOLD, the particular frame nas very few voice-like characteristics, and is most probably noise. Therefore, a background noise update is performed by closing channel switch 575 for the particular frame. The most recent voice metric sum VMSUM is also made available to channel SNR modifier 820 via line 815 for use in the modification algorithm.

In the preferred embodiment, the UPDATE THRESHOLD is set to a total voice metric sum value of 32. Since the minimum value in the voice matric table is 2, the minimum sum for 14 channels is 28. The voice metric table values remain at 2 until an SNR index of 12 (or 4.5 dB SNR) is reached. This means that an increased level of broadband noise (individual channels each having SNR values not greater than 4.125 dB) will still generate a sum of 28. Since the UPDATE THRESHOLD of 32 would not then be exceeded, the broadband noise voice metric will be correctly classified as noise and a background noise having an SNR index value greater than 24 (or at least 9.0 dB SNR) would cause the VMSUM to exceed the UPDATE THRESHOLD, and result in a voice or narrowband noise burst decision.

Many variations of the voice metric table are possible, as different types of metrics may be compensated for by the proper se1ection of the UPDATE THRESHOLD. Furthermore, the sensitivity of the speech/noise decision may also be chosen for a particular application. For example, in the preferred embodiment, the threshold may be adjusted to accommodate any single channel having an SNR value as sensitive as 4.5 dB to as insensitive as 15 dB. The corresponding UPDATE THRESHOLD would then be set within the range of 29 to 41.

In addition to performing the speech/noise decision utilizing voice metrics, voice metric calculator 810 keeps track of the time that has expired since the last background noise update. An update counter is tested on each frame to see if more than a given number of frames, each representing a predetermined time, has passed sihce the previous update. In the preferred embodiment utilizing 10 millisecond frames, if the update counter reaches 100—corresponding to a timing threshold of 1 second without updates—an update is performed regardless of the voice metric decision. However, any timing threshold within the range of 0.5 second to 4 seconds would be practical. As previously mentioned, this timing parameter test is used to prevent any sudden, large increases in noise level from being indefinitely interpreted as voice.

The basic function of channel SNR modifier 820 is to eliminate the detrimental effects of narrowband noise bursts on the noise suppression system. A narrowband noise burst may be defined as a momentary increase in channel energy for only a few channels. In the preferred embodiment, a high energy level above a 6 dB SNR threshold in fewer than 5 of the upper 10 channels is classified as a narrowband noise burst. Such a noise burst would normally create high gain values for only a few number of channels, which results in the "running water" type of background noise flutter described above.

Raw SNR estimates at 235 are applied to the input of channel SNR modifier 820, and modified SNR estimates are output at 825. Basically, SNR modifier 820 counts the number of channels which have channel SNR index values which exceed an index threshold. In the preferred embodiment, the index threshold is set to correspond to an SNR value within the range of 4 dB to 10 dB, preferably 6 dB SNR. If the number of channels is below a predetermined count threshold, then the decision to modify the SNR's is made. The count threshold represents a relatively few number of channels, i.e., not greate than 40% of the total number of channels N. In the preferred embodiment, the count threshold is set to 5 of the 10 measured channels. During the modification process itself, channel SNR modifier 820 either reduces the SNR of only those particular channels having an SNR index less than a SETBACK THRESHOLD (indicative of a narrowband noise channel), or reduces the SNR of all the channels if the voice metric sum is less than a metric threshold (indicative of a very weak energy frame). Hence, the channels containing the narrowband noise burst are attenuated so as to prevent them from detrimentally affecting the gain table look-up function.

SNR threshold block 830 provides a predetermined SNR threshold for each channel which must be exceeded by the modified channel SNR estimates before a high gain value can be produced. Only SNR estimates which have a value above the SNR threshold are directly applied to the gain table sets. Therefore, small background noise fluctuations are not allowed to produce gain values which represent voice. This implementation of an SNR threshold essentially presents an offset in the gain rise for channels having low signal-to-noise ratio. Preferably, the SNR threshold would be set within the range of 1.5 dB to 5 dB SNR to eliminate minor noise fluctuations. The SNR threshold may be implemented as a separate element as shown in FIG. 1, or it may be implemented as a "dead zone" in the characteristic gain curve for each gain table set 590.

FIG. 3 graphically illustrates the function of SNR threshold block 830, as well as the attenuation function of the channel gain values in each gain table set. On the horizontal axis, modified SNR estimates are shown in dB as would be output from channel SNR modifier 820 at 825. The vertical axis represents the channel gain (attenuation) as would be observed at the output of channel gain modifier 250 at 255. A maximum amount of background noise attenuation is achieved for channels having a minimum gain value. Note that SNR threshold block 830 is shown as a "dead zone" or offset in the gain rise curve of approximately 2.25 dB. Hence, an SNR estimate must exceed this threshold before the channel gain can rise above the minimum gain level shown. Also note that two curves are illustrated, each having a different minimum gain level. Upper curve labeled group A represents a low channel group, e.g., consisting of channels 1-4 in the preferred embodiment, while group B represents the higher frequency channels 5-14.

As evident from the graph, the low frequency channels have a minimum gain value of −13.1 dB, while the upper frequency channels have a minimum gain value of −20.7 dB. It has been found that less voice quality degradation occurs when the channels are divided into such groups. Although only two different gain curves are used in the preferred embodiment for gain table set number 1, it may prove advantageous to provide each channel with a different characteristic gain curve. Furthermore, as explained in the referenced Borth patent, multiple gain table sets are used to allow a wider choice of channel gain values depending on the particular background noise environment. Noise level quantizer 555 utilizes hysteresis to select a particular gain table set based upon the overall background noise estimates. The gain table selection signal, output from noise level quantizer 555, is applied to gain table switch 595 to implement the gain table selection process. Accordingly, one of a plurality of gain table sets 590 may be chosen as a function of overall average background noise level.

These noise suppression improvements eliminate the variability of the background noise suppression without requiring a large amount of gain smoothing. Background noise attenuation within the range of 10 dB to 25 dB is readily achieved with the present invention. With the improvements, the system requires gain smoothing having a time constant of only 10 to 20 milliseconds to obtain a flat or "white" residual noise background. Previous techniques required 40 to 60 millisecond time constant gain smoothing, which not only resulted in imperfect flutter reduction, but also substantially degraded the voice quality.

Since the overall operation of the improved noise suppression system is similar to that described in the previous Borth patent, the generalized flow diagram illustrated in FIGS. *6a/b* of that patent will be used to describe the present invention. The general organization of the operation of the present invention may still be organized in three functional groups: noise suppression loop—sequence block 604 of FIG. 6*a*, which is described in detail in FIG. *7a* of the Borth patent; automatic gain selector—sequence 615 of FIG. 6*b*, which has been modified for the present invention; and automatic background noise estimator—sequence 621 of FIG. 6*b*, which has also been modified in the present invention. The detailed flowcharts of FIG. 4*a* through 4*f* of the present application may be substituted for sequence blocks 615 and 621 of FIG. *6b* to describe the operation of improved noise suppression system 800. Hence, FIG. *6a* and *7a* of the Borth patent (4,628,529) describes the noise suppression loop performed on a sample-by-sample basis, while FIGS. 4*a* through 4*f* of the present invention describe the channel gain selection process and the background noise estimate update process performed on a frame-by-frame basis.

Figure 4A:
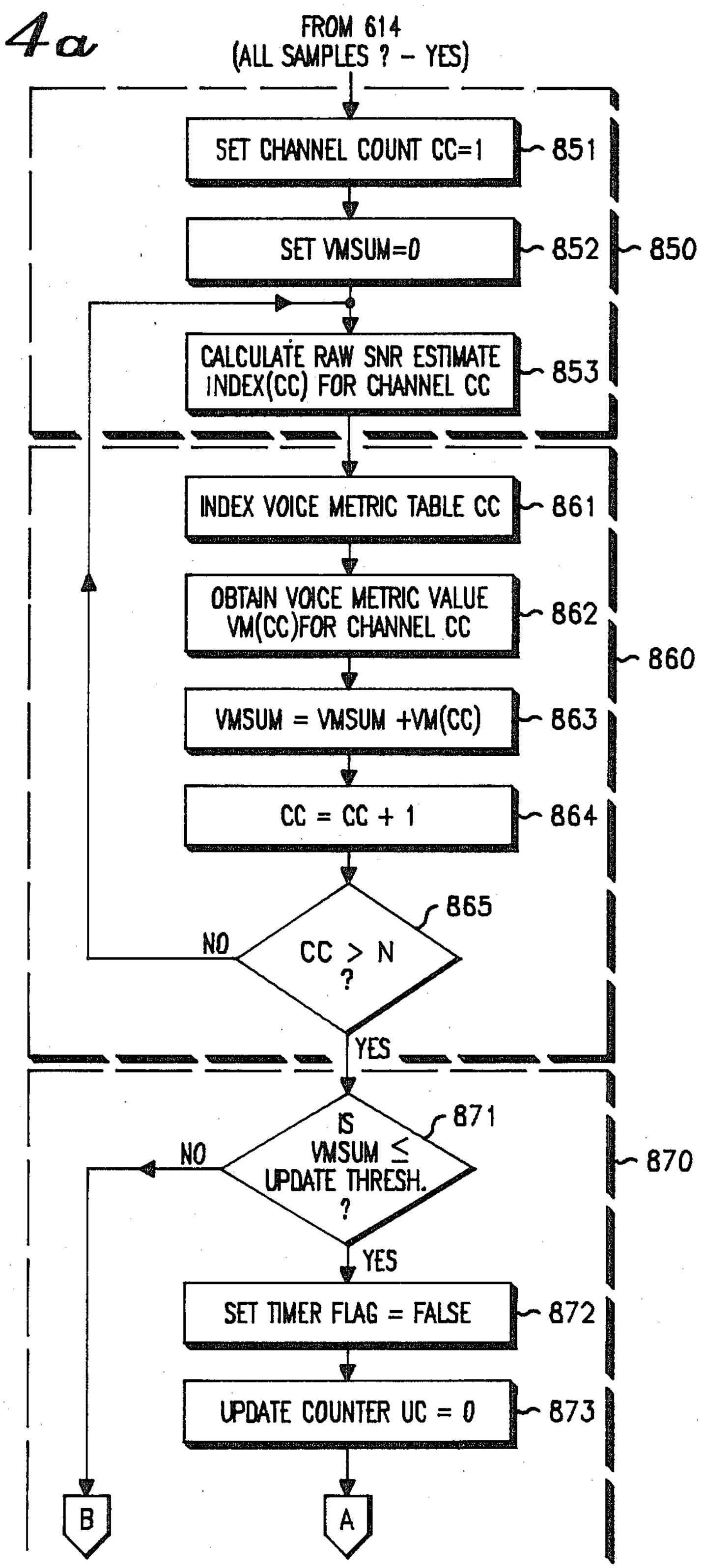
FIGS. 4a through 4f are flowcharts illustrating the specific sequence of operations performed in accordance with the practice of the preferred embodiment of the present invention.

Referring now to FIG. 4*a*, the operation of improved noise suppression system 800 begins from the "YES" output of decision step 614 of the aforementioned FIG. 6*a*. Hence, the actual spectral gain modification function for the particular frame has already been performed on a sample-by-sample basis utilizing gain values from the previous frame. Sequence 850 serves to generate the SNR estimates available at 235. First of all, the channel count CC is set equal to 1 in step 851. Next, the voice metric sum variable VMSUM is initialized to zero in step 852. Step 853 calculates the raw signal-to-noise ratio SNR for the particular channel as an SNR estimate index value INDEX(CC). The SNR calculation is simply a division of the per-channel energy estimates (signal-plus-noise) available at 225, by the per-channel background noise estimates (noise) at 325. However, other estimates of the signal-to-noise threshold may alternatively be used. Therefore, step 853 simply divides the current stored channel energy estimate (obtained from flowchart step 707 of the aforementioned FIG. 7*a*) by the current background noise estimate BNE(CC) from the previous frame.

In sequence 860, the voice metrics are calculated. First, the voice metric table for the particular channel is indexed in step 861 using the raw SNR estimate index INDEX(CC). The voice metric table is read in step 862 to obtain a voice metric value VM(CC) for the particular channel. This individual channel voice metric value is added to the voice metric sum VMSUM in step 863. The channel count CC is incremented in step 864, and tested in step 865. If the voice metrics for all N channels have not been calculated, control returns to step 853.

Sequence 870 illustrates the background noise estimate update decision process performed by voice metric calculator 810. The voice metric sum VMSUM is compared to UPDATE THRESHOLD in step 871. If VMSUM is less than or equal to UPDATE THRESHOLD, then the frame is probably a noise frame. TIMER FLAG is reset in step 872, and the update counter UC is reset in step 873. Control proceeds to step 878 where the UPDATE FLAG is set true, which means that a background noise estimate update will be performed for the current frame.

If VMSUM is greater than the UPDATE THRESHOLD, the frame is probably a voice frame. Nevertheless, step 874 tests the TIMER FLAG to see if a sudden, loud increase in background noise has been interpreted as speech. If the TIMER FLAG is true, the one second time interval was exceeded a number of frames ago, and background noise estimate updating is still required. This is due to the fact that only a partial background noise update is performed for each frame. If the TIMER FLAG is not true, the update counter UC is incremented in step 875, and tested in step 876. If 100 frames have occurred since the last background noise estimate update, the TIMER FLAG is set true in step 877, and the BNE UPDATE FLAG is set true in step 878. A series of partial background noise estimat updates are then performed until the voice metric sum VMSUM again falls below the UPDATE THRESHOLD. Note that the only place in the flowchart that the TIMER FLAG is reset is in step 872, when the voice metric sum VMSUM again resembles noise. If the update counter UC has not reached 100 frames, the instant frame is deemed to be a voice frame, and no background noise update is performed.

Figure 4B:
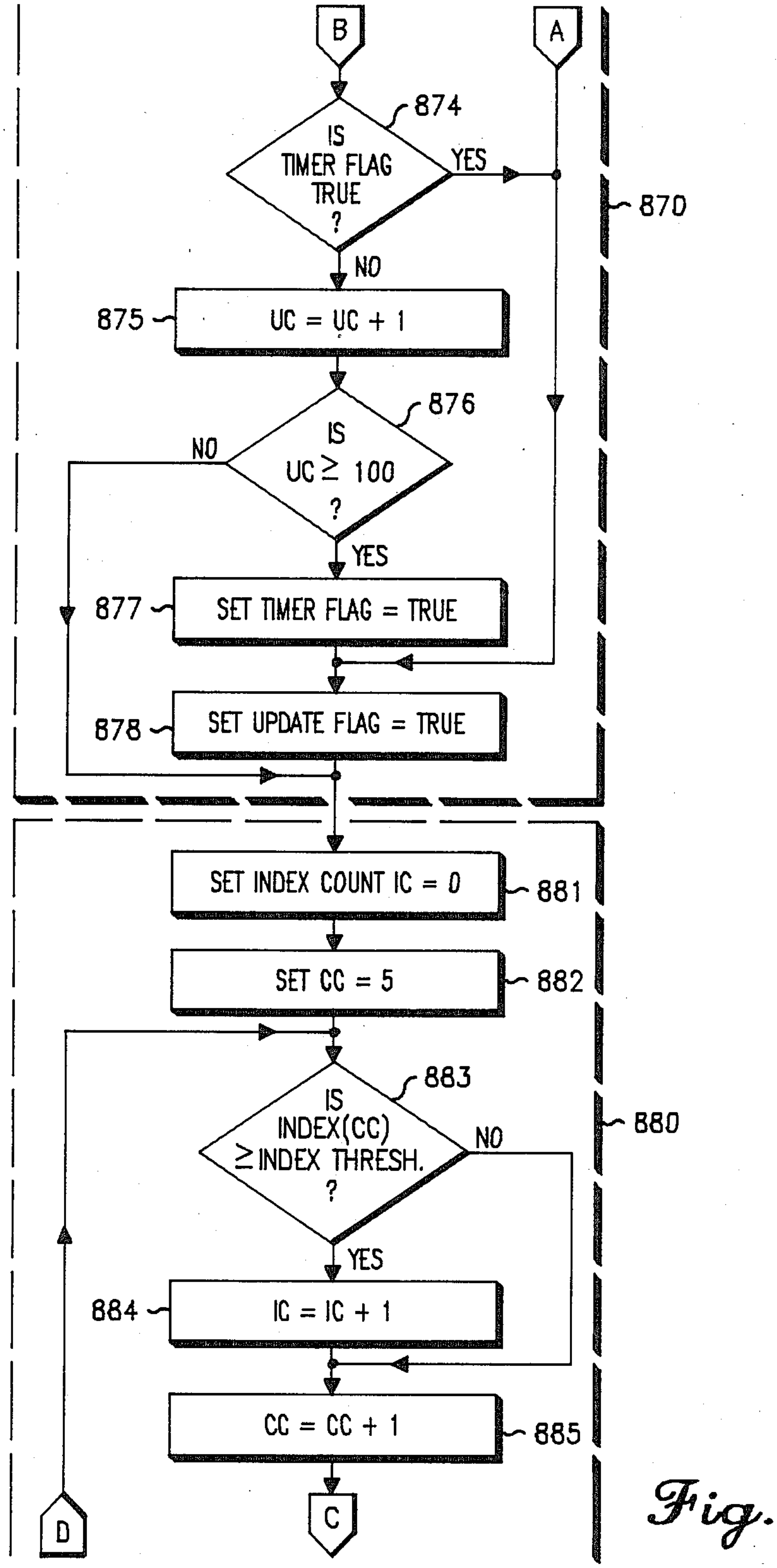
Figure 4C:
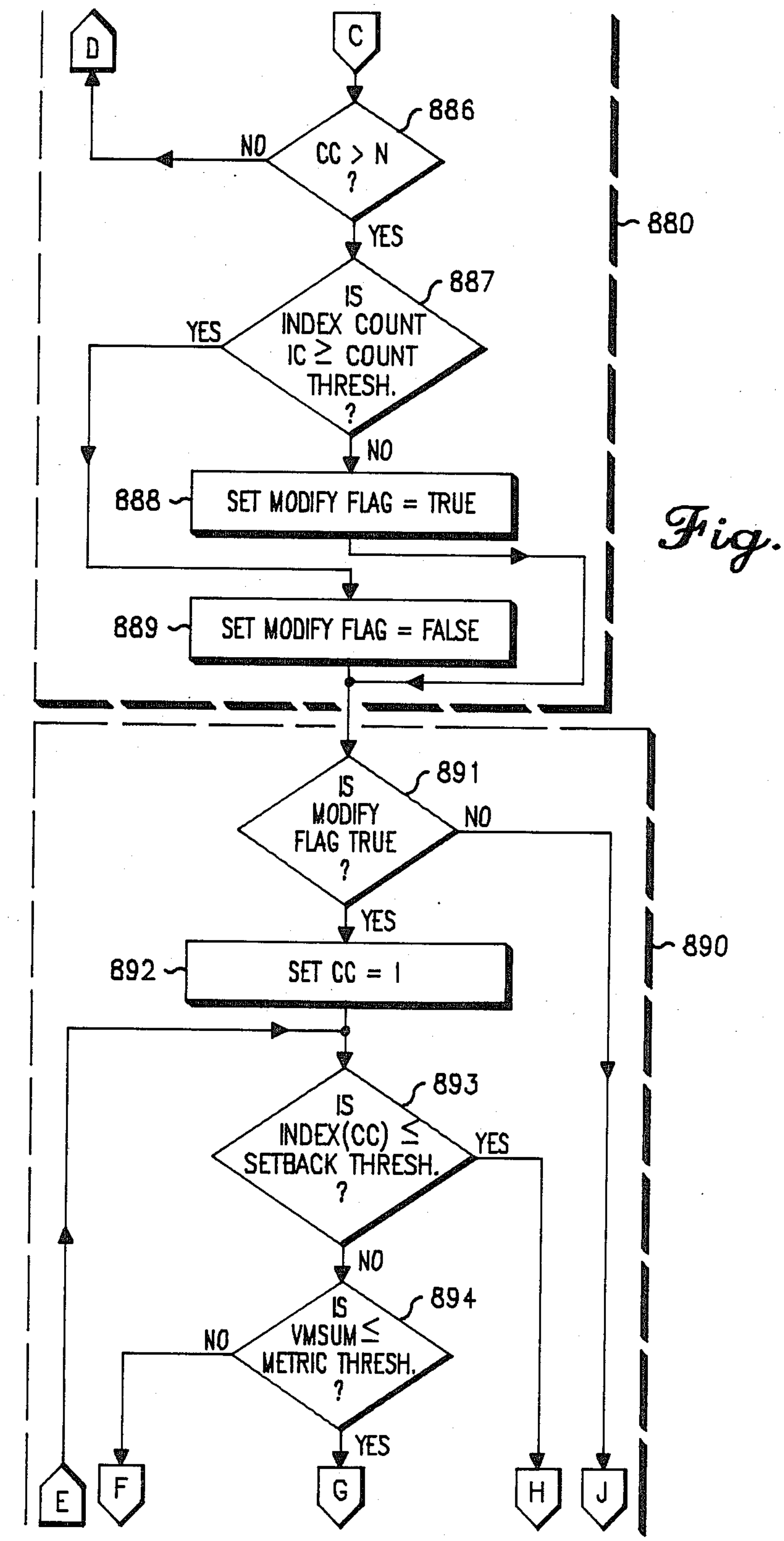

Referring now to sequence 880 of FIGS. 4*b* and 4*c*, the decision to modify the channel signal-to-noise ratios is performed next. An index counter variable IC is initialized in step 881. The channel counter CC is set equal to 5 in step 882, so as to count only the upper 10 of the 14 channels having a high energy. The raw SNR estimate index INDEX(CC) is tested in step 883 to see if it has reached an INDEX THRESHOLD which would correspond to approximately 6 dB SNR. Here, the assumption is made that at least 5 of the upper 10 channels of a voice frame should contain energy having an SNR of at least 6 dB. If the particular channel SNR INDEX(CC) is above the INDEX THRESHOLD, the index count IC is incremented in step 884. If not, the channel count CC is incremented in step 885 and tested in step 886 to look at the next channel.

When all 10 upper channels have been measured, index count IC represents the number of channels having an SNR estimate index higher than the INDEX THRESHOLD. The index count IC is then tested against a COUNT THRESHOLD in step 887. If IC indicates that more channels than the COUNT THRESHOLD, e.g., 5 of the upper 10 channels, contain sufficient energy, then the frame is probably a voice frame, and the MODIFY FLAG is set false in step 889 to prevent channel SNR modification. If only a few channels contain high energy, which would be representative of a frame of narrowband noise, then the MODIFY FLAG is set true in step 888.

Sequence 890 describes the SNR modification process performed by channel SNR modifier block 820. Initially, the MODIFY FLAG is tested in step 891. If it is false, the channel SNR modification process is bypassed If the MODIFY FLAG is true, the channel counter CC is initialized in step 892. Next, each channel SNR estimate index is tested in step 893 to see if it is less than or equal to a SETBACK THRESHOLD. The SETBACK THRESHOLD, which may have a value corresponding to 6 dB SNR, represents the maximum SNR estimate which is representative of background noise flutter. Only channels having low SNR estimate index pass this test. However, even if the channel index is greater than the SETBACK THRESHOLD, the voice metric sum VMSUM is again tested in step 894. If VMSUM is less than or equal to a METRIC THRESHOLD, which corresponds to a representative total voice metric of a narrowband noise frame, the INDEX(CC) is modified in step 895 by setting it equal to the minimum index value of 1. The channel counter CC is incremented in step 896 and tested in step 897 to see if 05 all the channels have been tested. If not, control returns to step 893 to test the next channel index. Hence, a frame containing either channel energy fluctuations or narrowband noise is modified such that the frame does not produce undesirable gain variations.

Sequence 900 performs the function of SNR threshold block 830. The channel counter CC is initialized in step 901. The SNR index for the particular channel is tested against an SNR THRESHOLD in step 902. In the preferred embodiment, the SNR THRESHOLD represents an index value corresponding to 2.25 dB SNR. If INDEX(CC) is above the SNR THRESHOLD, it may be used to index the gain table. If not, the index value is again set equal to 1 in step 903, which represents the minimum index value. The channel counter CC is incremented in step 904 and tested in step 905. This SNR threshold testing process serves to reduce minor background noise variations in all the channels.

Figure 4D:
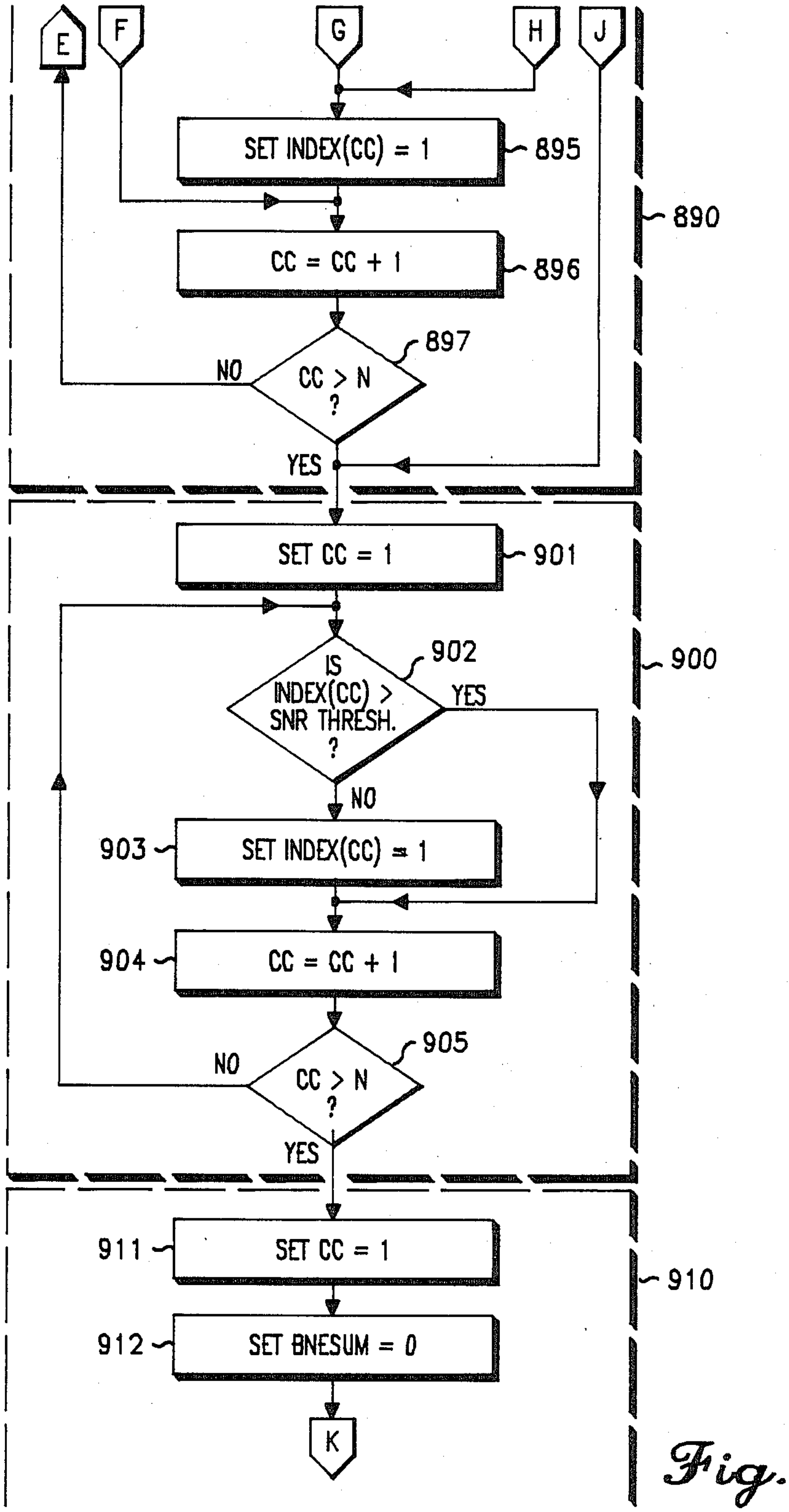
Figure 4E:
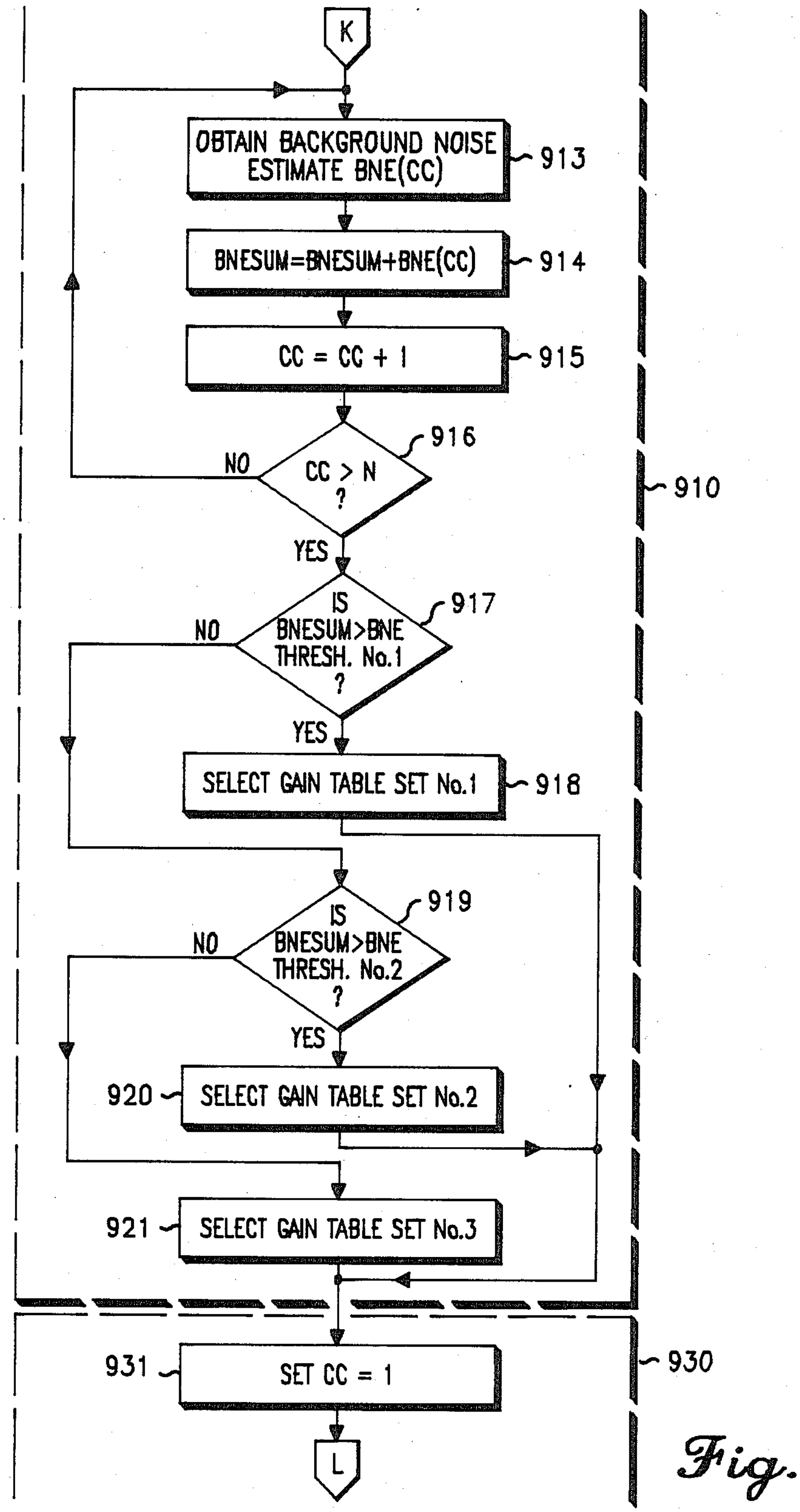
Figure 4F:
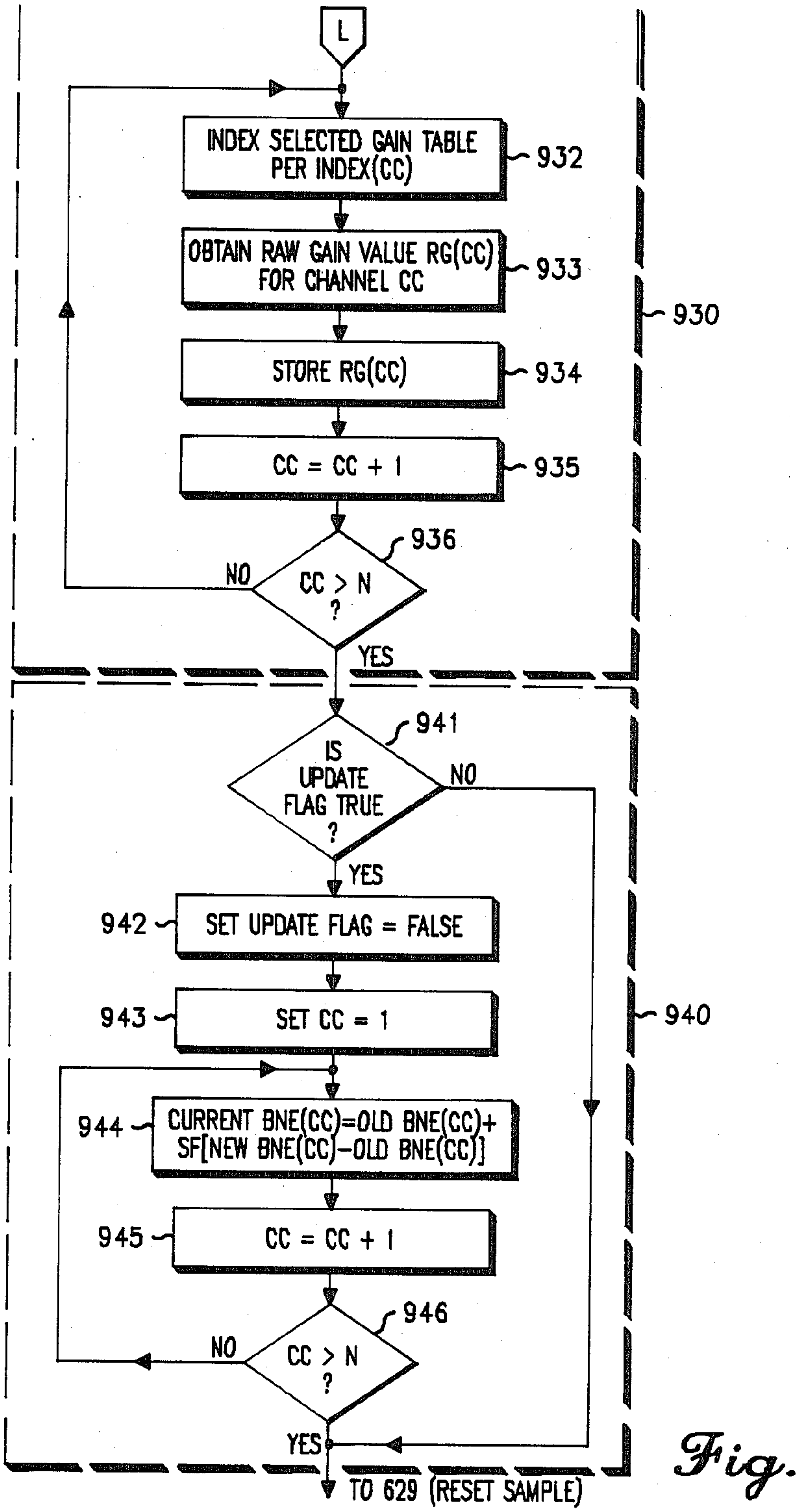

Referring now to sequence 910 of FIG. 4*d*, the gain table sets are chosen by noise level quantizer 555 and gain table switch 595. In step 911, the channel counter CC is initialized, and in step 912, a variable called background noise estimate sum, BNESUM, is initialized. In step 913, the current background noise estimate BNE(CC) is obtained for each channel, and added to BNESUM in step 914. Step 915 increments the channel counter CC, and step 916 tests the channel counter to see if the background noise estimates for all N channels have been totaled.

In step 917, BNESUM is compared to a first background noise estimate threshold. If it is greater than BNE THRESHOLD 1, then gain table set number 1 is selected in step 918. Similarly, step 919 again tests BNESUM to see if it is greater than the lower value of BNE THRESHOLD 2. If BNESUM is greater than BNE THRESHOLD 2 but less than BNE THRESHOLD 1, then gain table set number 2 is selected in step 920. Otherwise, gain table set number 3 is selected in step 921. Hence, gain table sets 590 are selected as a function of overall average background noise level.

Sequence 930 describes the steps for obtaining raw gain values RG(CC) from the gain table sets 590. Step 931 sets the channel counter CC equal to 1. The selected gain table is indexed in step 932 using the channel SNR estimate index INDEX(CC) which has passed the SNR modification and threshold tests. The raw gain value RG(CC) is obtained from the selected gain table in step 933, and is then stored in step 934 for use as the gain values for the next frame of noise suppression. The channel counter CC is incremented in step 935, and tested in step 936 as before. As described in U.S. Pat. No. 4,630,305, the raw gain values for each channel at 535 are then applied to gain smoothing filter 530 for smoothing on a per-sample basis.

Finally, sequence 940 describes the actual background noise estimate updating process performed in block 420 of FIG. 1. Step 941 initially tests the UPDATE FLAG to see if a background noise estimate should be performed. If the UPDATE FLAG is false, then the frame is a voice frame and no background noise update can occur. Otherwise, the background noise update is performed—which is simulated by closing channel switch 575—during a noise frame. In step 942, the UPDATE FLAG is reset to false.

Steps 942 through 945 serve to update the current background noise estimate in each of the N channels via the equation:

$$E(i,k)=E(i,k-1)+SF[(PE(i)-E(i,k-1)],\ i=1,2,\ldots,N$$

where E(i,k) is the current energy noise estimate for channel (i) at time (k), E(i, k−1) is the old energy noise estimate for channel (i) at time (k−1), PE(i) is the current pre-processed energy estimate for channel (i), and SF is the smoothing factor time constant used in smoothing the background noise estimates. Therefore, E(i, k−1) is stored in energy estimate storage register 585, and the SF term performs the function of smoothing filter 580. In the present embodiment, SF is selected to be 0.1 for a 10 millisecond frame duration.

Step 943 initializes the channel count CC to 1. Step 944 performs the above equation in terms of the current background noise estimate available at 325, the old background noise estimate OLD BNE(CC) stored in energy estimate storage register 585, and the new background noise estimate NEW BNE(CC) available from switch 575. Step 945 increments the channel counter CC, and step 946 tests to see if all N channels have been processed. If true, the background noise estimate update is completed, and operation is returned to step 629 of FIG. 6*b* of the aforementioned Borth patent to reset the sample counter and increment the frame counter. Control then returns to perform noise suppression on a sample-by-sample basis for the next frame.

In review, it can now be seen that the present invention provides the following improvements: (a) a reduction in background noise flutter by offsetting the gain rise of the gain tables until a certain SNR value is obtained; (b) immunity to narrowband noise bursts through modification of the SNR estimates based on the voice metric calculation and the channel energies; and (c) more accurate background noise estimates via performing the update decision based on the overall voice metric and the time interval since the last update.

While specific embodiments of the present invention have been shown and described herein, further modifications and improvements may be made by those skilled in the art. For example, the operational flow is described herein as performed in real time. However, due to inherent hardware limitations, previous background noise estimates for channel gain values may be stored for use in the next frame. All such modification which retain the basic underlying principles disclosed and claims herein are within the scope of this invention.

What is claimed is:

1. An improved noise suppression system for attenuating the background noise from a noisy input signal to produce a noise-suppressed output signal, said noise suppression system comprising:

means for separating the input signal into a plurality of pre-processed signals representative of selected frequency channels;

means for generating estimates of the signal-plus-noise energy and the noise energy in each individual channel;

means for producing a gain value for each individual channel in response to said channel energy estimates, said gain values having a minimum gain value for each channel, said gain value producing means including threshold means for allowing gain values above said minimum gain value to be prodeced only when said signal-plus-noise energy estimates exceed said noise energy estimates by a predetermined amount; and means for modifying the gain of each of said plurality of pre-processed signals in esponse to said gain values to provide a plurality of post-processed signals.

2. The noise suppression system according to claim 1, wherein said gain value producing means produces gain values based upon the signal-to-noise ratio (SNR) of said channel energy estimates, and wherein said SNR estimates are compared with a predefined SNR threshold such that channels having SNR estimates below said SNR threshold produce minimum gain values.

3. The noise suppression system according to claim 2, wherein said predefined SNR threshold corresponds to an SNR value within the range of 1.5 dB to 5 dB SNR.

4. The noise suppression system according to claim 3, wherein said predefined SNR threshold corresponds to an SNR value of approximately 2.25 dB SNR.

5. The noise suppression system according to claim 1, wherein said gain modifying means provides a maximum amount of attenuation of the pre-processed signal in a particular channel having a minimum gain value.

6. The noise suppression system according to claim 1, wherein gain values produce a higher amount of attenuation for high frequency channels than low frequency channels.

7. The noise suppression system according to claim 1, wherein said gain value producing means further includes a plurality of gain tables, each gain table having predetermined individual channel gain values corresponding to said individual channel energy estimates, and gain table selection means for automatically selecting one of said plurality of gain tables as a function of the overall average background noise level of said input signal.

8. The noise suppression system according to claim 1, further includes means for combining said plurality of post-processed signals to produce said noise-suppressed output signal.

9. An improved noise suppression system for attenuating the background noise from a noisy input signal to produce a noise-suppressed output signal, said noise suppression system comprising:

means for separating the input signal into a plurality of pre-processed signals representative of selected frequency channels;

means for generating and storing an estimate of the background noise power spectral density of said pre-processed signals, said background noise estimate generating means including means for modifying said background noise estimate in response to a timing parameter indicative of the time interval since the previous background noise estimate modification;

means for generating an estimate of the signal-to-noise ratio (SNR) in each individual channel based upon said modified background noise estimates;

means for producing a gain value for each individual channel in response to said channel SNR estimates; and means for modifying the gain of each of said plurality of pre-processed signals in response to said gain values to provide a plurality of post-procesed signals.

10. The noise suppression system according to claim 9, wherein said background noise estimate modifying means includes means for producing said timing parameter, and means for comparing said timing parameter to a predetermined timing threshold such that a background noise estimate modification is performed when said timing parameter exceeds said timing threshold.

11. The noise suppression system according to claim 10, wherein said predetermined timing threshold is in the range of 0.5 second to 4 seconds.

12. The noise suppression system according to claim 11, wherein said predetermined timing threshold is approximately equal to 1 second.

13. The noise suppression system according to claim 10, wherein said background noise estimate modifying means further includes means for generating an estimate of the energy in each individual channel, and means for producing a multi-channel energy parameter in response to the total value of all individual channel energy estimates.

14. The noise suppression system according to claim 13, wherein said background noise estimate modifying means further includes means for comparing said multi-channel energy parameter to a predetermined energy threshold such that a background noise estimate modification is performed when said multi-channel energy parameter is less than said energy threshold.

15. The noise suppression system according to claim 13, wherein said multi-channel energy parameter is generated by translating said individual channel SNR estimates into individual channel voice metrics and summing the individual channel voice metrics, the voice metric sum being a measurement of the overall voice-like characteristics of the energy in all channels.

16. The noise suppression system according to claim 14, wherein said background noise estimate modifying means modifies said background noise estimates in response to said timing parameter regardless of said multi-channel energy parameter.

17. The noise suppression system according to claim 13, wherein said multi-channel energy parameter producing means accommodates for minor variations in individual channel energy estimates such that said minor variations do not significantly affect said multi-channel energy parameter.

18. The noise suppression system according to claim 14, wherein said predetermined energy threshold is set such that a background noise estimate modification is performed if all channels exhibit individual SNR values less than 6 dB SNR.

19. The noise suppression system according to claim 14, wherein said predetermined energy threshold is set such that a background noise estimate modification is not performed if any single channel exhibits an SNR value of at least 6 dB SNR.

20. The noise suppression system according to claim 9, wherein said gain value producing means further includes a plurality of gain tables, each gain table having predetermined individual channel gain values corresponding to various individual channel SNR estimates, and gain table selection means for automatically selecting one of said plurality of gain tables as a function of the overall average background noise level of said input signal.

21. The noise suppression system according to claim 9, further includes means for combining said plurality of post-processed signals to produce said noise-suppressed output signal.

22. An improved noise suppression system for attenuating the background noise from a noisy input signal to produce a noise-suppressed output signal, said noise suppression system comprising:

means for separating the input signal into a plurality of pre-processed signals representative of a number N of selected frequency channels means for generating an estimate of the energy in each individual channel;

means for monitoring said channel energy estimates and for distinguishing narrowband noise bursts from speech energy and background noise energy, thereby producing a modification signal;

means for selectively modifying said channel energy estimates in response to said modification signal such that channel energy estimates representative of narrowband noise bursts are modified;

means for producing a gain value for each individual channel in response to each modified channel energy estimate; and means for modifying the gain of each of said plurality of pre-processed signals in response to said gain values to provide a plurality of post-processed signals.

23. The noise suppression system according to claim 22, wherein said modification signal is indicative of the total number of individual channels having energy estimates exceeding a predetermined energy threshold.

24. The noise suppression system according to claim 23, wherein said predetermined energy threshold corresponds to a signal-to-noise ratio (SNR) value within the range of 4 dB to 10 dB SNR.

25. The noise suppression system according to claim 24, wherein said predetermined energy threshold corresponds to an SNR value of approximately 6 dB SNR.

26. The noise suppression system according to claim 23, wherein said channel energy estimate modifying means includes means for comparing said modification signal to a predetermined count threshold such that a channel energy estimate modification is performed when said total number of individual channels is less than said count threshold.

27. The noise suppression system according to claim 26, wherein said predetermined count threshold corresponds to less than 40% ×N.

28. The noise suppression system according to claim 22, wherein said gain modifying means provides a maximum amount of attenuation of the pre-processed signal in a particular channel having a modified channel energy estimate.

29. The noise suppression system according to claim 22, wherein said gain value producing means further includes a plurality of gain tables, each gain table having predetermined individual channel gain values corresponding to various individual channel energy estimates, and gain table selection means for automatically selecting one of said plurality of gain tables as a function of the overall average background noise level of said input signal.

30. The noise suppression system according to claim 22, further includes means for combining said plurality of post-processed signals to produce said noise-suppressed output signal.

31. An improved method of attenuating the background noise from a noisy input signal to produce a noise-suppressed output signal in a noise suppression system comprising the steps of:

separating the input signal into a plurality of preprocessed signals representative of a number N of selected frequency channels;

generating an estimate of the energy in each individual channel;

generating and storing an estimate of the background noise power spectral density of said pre-processed signals;

generating an estimate of the signal-to-noise ratio (SNR) in each individual channel based upon said background noise estimates and said channel energy estimates;

producing a gain value for each individual channel in response to said channel SNR estimates, said gain values having a range of minimal values, said gain value producing step including the steps of providing a predefined SNR threshold and comparing said channel SNR estimates to said predefined SNR threshold such that channels having SNR estimates below said SNR threshold produce gain values within said minimal range; and modifying the gain of each of said plurality of preprocessed signals in response to said gain values to provide a plurality of post-processed signals.

32. The method according to claim 31, wherein said predefined SNR threshold corresponds to an SNR value within the range of 1.5 dB to 5 dB SNR.

33. The method according to claim 31, wherein said gain modifying step provides a maximum amount of attenuation of the pre-processed signal in a particular channel having a gain value within said minimal range.

34. The method according to claim 31, including the step of modifying said background nose estimate in response to a timing parameter indicative of the time interval since the previous background noise estimate modification.

35. The method according to claim 34, wherein said background noise estimate modifying step includes the steps of producing said timing parameter and comparing said timing parameter to a predetermined timing threshold such that a background noise estimate modification is performed when said timing parameter exceeds said timing threshold.

36. The method according to claim 35, wherein said predetermined timing threshold is in the range of 0.5 second to 4 seconds.

37. The method according to claim 34, wherein said background noise estimate modifying step further includes the step of producing a multi-channel energy parameter in response to the total value of all individual channel SNR estimates.

38. The method according to claim 37, wherein said background noise estimate modifying step further includes the step of comparing said multi-channel energy parameter to a predetermined energy threshold such that a background noise estimate modification is performed when said multi-channel energy parameter is less than said energy threshold.

39. The method according to claim 38, wherein said multi-channel energy parameter is generated by translating said individual channel SNR estimates into individual channel voice metrics and summing the individual channel voice metrics, the voice metric sum being a measurement of the overall voice-like characteristics of the energy in all channels.

40. The method according to claim 38, wherein said background noise estimate modifying step modifies said background noise estimates in response to said timing parameter regardless of said multi-channel energy parameter.

41. The method according to claim 38, wherein said predetermined energy threshold is set such that a background noise estimate modification is performed if all channels exhibit individual SNR values less than 6 dB SNR.

42. The method according to claim 38, wherein said predetermined energy threshold is set such that a background noise estimate modification is not performed if any single channel exhibits an SNR value of at least 6 dB SNR.

43. The method according to claim 31, including the steps of monitoring said channel SNR estimates and distinguishing narrowband noise bursts from speech energy and background noise energy thereby producing a modification signal, and selectively modifying said channel SNR estimates in response to said modification signal such that channel SNR estimates representative of narrowband noise bursts are modified.

44. The method according to claim 43, wherein said modification signal is indicative of the total number of individual channel having SNR estimates exceeding a predetermined modification threshold.

45. The method according to claim 44, wherein said predetermined modification threshold corresponds to an SNR value within the range of 4 dB to 10 dB SNR.

46. The method according to claim 44, wherein said channel SNR estimate modifying step includes the step of comparing said modification signal to a predetermined count threshold such that a channel SNR estimate modification is performed when said total number of individual channels is less than said count threshold.

47. The method according to claim 46, wherein said predetermined count threshold corresponds to less than 40% ×N.

48. The method according to claim 43, wherein said gain modifying step provides a maximum amount of attenuation of the pre-processed signal in a particular channel having a modified channel SNR estimate.

49. The method according to claim 31, wherein said gain value producing step further includes the step of automatically selecting one of a plurality of gain tables as a function of the overall average background noise level of said input signal, each gain table having predetermined individual channel gain values corresponding to various individual channel SNR estimates.

50. The method according to claim 31, further includes the step of combining said plurality of post-processed signals to produce said noise-suppressed output signal.

* * * * *